US011828765B2

United States Patent
Kaneda et al.

(10) Patent No.: US 11,828,765 B2
(45) Date of Patent: Nov. 28, 2023

(54) AUTOMATIC ANALYSIS APPARATUS AND METHOD OF CONTROLLING AUTOMATIC ANALYSIS APPARATUS

(71) Applicant: JEOL Ltd., Tokyo (JP)

(72) Inventors: Tamami Kaneda, Tokyo (JP); Makoto Asakura, Tokyo (JP)

(73) Assignee: JEOL Ltd., Tokyo (JP)

(*) Notice: Subject to any disclaimer, the term of this patent is extended or adjusted under 35 U.S.C. 154(b) by 25 days.

(21) Appl. No.: 17/229,191

(22) Filed: Apr. 13, 2021

(65) Prior Publication Data

US 2021/0318345 A1 Oct. 14, 2021

(30) Foreign Application Priority Data

Apr. 14, 2020 (JP) ................................. 2020-072338

(51) Int. Cl.
*G01N 35/00* (2006.01)

(52) U.S. Cl.
CPC .............................. *G01N 35/00712* (2013.01)

(58) Field of Classification Search
CPC ................... G01N 35/00712; G01N 2035/009
See application file for complete search history.

(56) References Cited

U.S. PATENT DOCUMENTS

| 6,733,728 | B1* | 5/2004 | Mimura | G01N 35/00663 |
| | | | | 422/65 |
| 2002/0051737 | A1* | 5/2002 | Sollbohmer | G01N 35/1065 |
| | | | | 422/63 |
| 2004/0091396 | A1 | 5/2004 | Nakamura et al. | |
| 2005/0013736 | A1* | 1/2005 | McKeever | G01N 35/025 |
| | | | | 422/65 |
| 2005/0013737 | A1* | 1/2005 | Chow | G01N 35/025 |
| | | | | 422/63 |

(Continued)

FOREIGN PATENT DOCUMENTS

| EP | 3686605 A1 | 7/2020 |
| EP | 4119950 A1 | 1/2023 |

(Continued)

OTHER PUBLICATIONS

Extended European Search Report issued in EP21161976.2 dated Aug. 26, 2021.
Office Action issued in EP21161976.2 dated Mar. 16, 2023.

*Primary Examiner* — Shogo Sasaki
(74) *Attorney, Agent, or Firm* — THE WEBB LAW FIRM (57) ABSTRACT

An automatic analysis apparatus of the present invention includes: a measurement section that measures a sample; a remaining quantity detecting section that detects that a remaining quantity of a consumable article used in the measurement section has become less than or equal to a predetermined quantity that is set in advance; a setting section that is capable of setting in which mode, of a first mode and a second mode applied for operation control of the measurement section, to operate the measurement section for each consumable article when the remaining quantity detecting section detects that the remaining quantity of the consumable article has become less than or equal to the predetermined quantity; and a control section that controls operation of the measurement section based on the setting of the setting section.

11 Claims, 3 Drawing Sheets

(56) References Cited

U.S. PATENT DOCUMENTS

| | | | | |
|---|---|---|---|---|
| 2006/0148063 A1* | 7/2006 | Fauzzi | ................... | G01N 1/31 |
| | | | | 422/65 |
| 2007/0086923 A1* | 4/2007 | Li | ..................... | B01L 3/0203 |
| | | | | 422/400 |
| 2016/0131674 A1 | 5/2016 | Shibata et al. | | |
| 2019/0331706 A1 | 10/2019 | Asakura et al. | | |
| 2020/0241025 A1 | 7/2020 | Asakura et al. | | |

FOREIGN PATENT DOCUMENTS

| | | |
|---|---|---|
| JP | H0584864 U | 11/1993 |
| JP | 200428931 A | 1/2004 |

\* cited by examiner

AUTOMATIC ANALYSIS APPARATUS AND METHOD OF CONTROLLING AUTOMATIC ANALYSIS APPARATUS

CROSS-REFERENCE TO RELATED APPLICATION

This application claims priority to Japanese Patent Application No. 2020-072338 filed Apr. 14, 2020, the disclosure of which is hereby incorporated by reference in its entirety.

BACKGROUND OF THE INVENTION

Field of the Invention

The present invention relates to an automatic analysis apparatus and a method of controlling the automatic analysis apparatus.

Description of Related Art

An automatic analysis apparatus is an apparatus for quickly and accurately analyzing multiple components included in a sample, and is used in various fields such as biochemical inspections and blood transfusion inspections. The automatic analysis apparatus includes a measurement section that measures the sample. Many consumable articles are used in the measurement section. In operating the measurement section, when any consumable article becomes in short supply, it is necessary to limit a function related to that consumable article.

JP 2004-28931 A discloses two methods for coping with the shortage of reagent in an analysis module: a method in which analysis is continued by disabling the analysis of an analysis item for which the shortage of reagent occurs in the analysis module (hereinafter referred to as a "first method"); and a method in which the analysis is continued after temporarily suspending the analysis in the analysis module and changing the reagent by an operator (hereinafter referred to as a "second method"). JP 2004-28931 A also discloses a technique in which whether to adopt the first method or the second method is set for each measurement item. Furthermore, J P 2004-28931 A discloses a technique in which the second method is adopted when the remaining quantity of at least one of a reagent, a cleaning solution, a diluent solution, and the like used for measurement items becomes in short supply.

However, the technique disclosed in JP 2004-28931 A is a technique in which designation or non-designation of changing reagent is set for each measurement item and the operation of analysis modules is controlled based on the setting when a shortage of reagent occurs, and thus has the following problem to be solved.

First, when the first method and the second method are compared in view of measurement efficiency in analyzing the sample, adopting the first method results in higher measurement efficiency. This is because adopting the second method results in lowering of the measurement efficiency due to the suspension of the analysis in an analysis module.

Besides the reagent, a cleaning solution, a diluent solution, and the like are also used in an analysis module. In this regard, in the technique disclosed in JP 2004-28931 A, the designation or non-designation of changing reagent is set for each measurement item, and the second method is adopted when the remaining quantity of at least one of a reagent, a cleaning solution, a diluent solution, and the like used for measurement items for which the designation of changing reagent is set becomes in short supply. Thus, in the technique disclosed in JP 2004-28931 A, when a shortage of reagent occurs in an analysis module, the analysis in the analysis module is temporarily suspended until the reagent is changed even though a shortage of another liquid such as a cleaning solution or a diluent solution does not occur. Therefore, the measurement in the analysis module is not always performed efficiently in the technique disclosed in JP 2004-28931 A.

SUMMARY OF THE INVENTION

An object of the present invention is to provide an automatic analysis apparatus and a method of controlling the automatic analysis apparatus in which a measurement section that measures a sample can be operated more efficiently.

An automatic analysis apparatus according to the present invention includes a measurement section that measures a sample; a remaining quantity detecting section that detects that a remaining quantity of a consumable article used in the measurement section has become less than or equal to a predetermined quantity that is set in advance; a setting section that is capable of setting in which mode, of a first mode and a second mode applied for operation control of the measurement section, to operate the measurement section for each consumable article when the remaining quantity detecting section detects that the remaining quantity of the consumable article has become less than or equal to the predetermined quantity; and a control section that controls operation of the measurement section based on the setting of the setting section.

A method of controlling an automatic analysis apparatus according to the present invention is a method of controlling an automatic analysis apparatus including a measurement section that measures a sample and a remaining quantity detecting section that detects that a remaining quantity of a consumable article used in the measurement section has become less than or equal to a predetermined quantity that is set in advance, the method including: a step of setting in which mode, of a first mode and a second mode applied for operation control of the measurement section, to operate the measurement section for each consumable article when the remaining quantity detecting section detects that the remaining quantity of the consumable article has become less than or equal to the predetermined quantity; and a step of controlling operation of the measurement section based on the setting.

According to the present invention, a measurement section that measures a sample can be operated more efficiently.

DESCRIPTION OF THE INVENTION

An embodiment of the present invention will be described in detail below with reference to the drawings. In the specification and the drawings, components having the same function or configuration will be given the same reference numeral, and overlapping descriptions will be omitted.

<Configuration of Automatic Analysis Apparatus>

Figure 1:
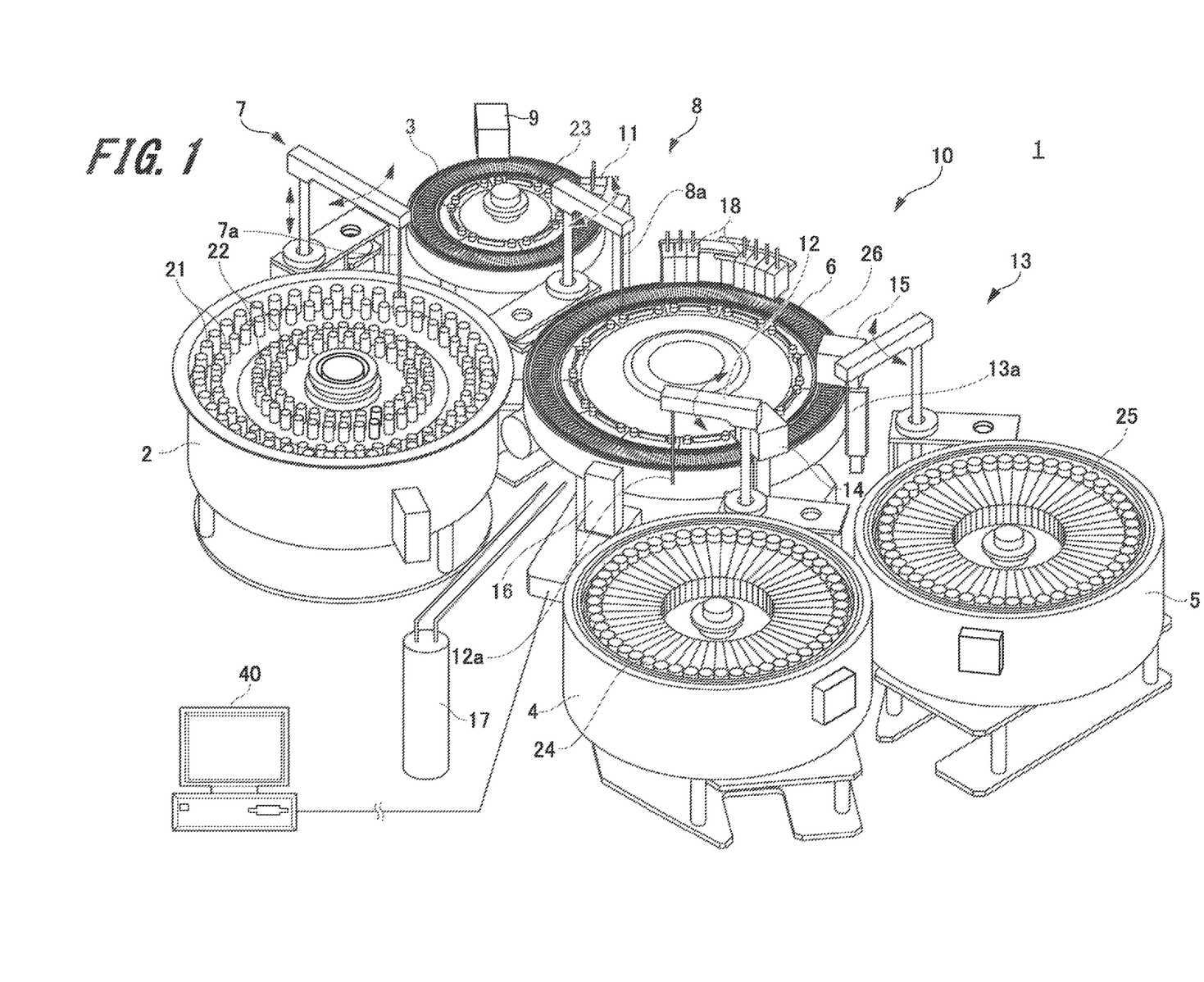
FIG. 1 is a schematic perspective view schematically showing an example of an automatic analysis apparatus according to an embodiment of the present invention.

FIG. 1 is a schematic perspective view schematically showing an example of an automatic analysis apparatus according to the embodiment of the present invention.

Although an example where the automatic analysis apparatus is a biochemical analysis apparatus will be described in the embodiment of the present invention, the automatic analysis apparatus according to the present invention may be applied to an analysis apparatus other than the biochemical analysis apparatus. The biochemical analysis apparatus is an apparatus for analyzing biological components included in a sample such as blood or urine. The automatic analysis apparatus according to the present invention may also be applied to an analysis apparatus having both of a biochemical analysis function and an electrolyte analysis function.

As shown in FIG. 1, an automatic analysis apparatus 1 includes a measurement section 10 that measures a sample and a control device 40. The measurement section 10 includes a sample turntable 2, a dilution turntable 3, a first reagent container containing unit 4, a second reagent container containing unit 5, and a reaction turntable 6. The measurement section 10 also includes a sample diluting unit 7, a sampling unit 8, a dilution agitation device 9, a dilution cleaning device 11, a first dispensing unit 12, a second dispensing unit 13, a first reaction agitation device 14, a second reaction agitation device 15, a multi-wavelength photometer 16, a constant-temperature chamber 17, and a reaction container cleaning device 18.

The sample turntable 2 is formed like a container having a substantially cylindrical shape in which one end in the axial direction opens. A plurality of sample containers 21 and a plurality of diluent solution containers 22 are contained in the sample turntable 2. The sample containers 21 are containers for containing a sample such as blood, urine, or serum. The diluent solution containers 22 are containers for containing a special diluent solution other than a liquid filling the inside of a dilution dispensing probe described later (for example, a physiological salt solution), which is an ordinary diluent solution. That is, diluent solutions used in the measurement section 10 include the ordinary diluent solution (physiological salt solution) and the special diluent solution different from it.

The plurality of sample containers 21 are arranged in alignment at a predetermined interval in the circumferential direction of the sample turntable 2. The plurality of sample containers 21 are set in two lines at a predetermined interval in the radial direction of the sample turntable 2.

The plurality of diluent solution containers 22 are arranged on the inner side relative to the plurality of sample containers 21 in the radial direction of the sample turntable 2. The plurality of diluent solution containers 22 are arranged in alignment at a predetermined interval in the circumferential direction of the sample turntable 2. The plurality of diluent solution containers 22 are set in two lines at a predetermined interval in the radial direction of the sample turntable 2.

Note that the configuration of the measurement section 10 is not limited to the configuration in which the above-mentioned special diluent solution is only supplied from the diluent solution containers 22 arranged on the sample turntable 2, and may be a configuration in which the special diluent solution is supplied from a container or the like placed at a position where the dilution dispensing probe can suction it, or may be a configuration in which the special diluent solution is directly supplied to dilution containers 23. The plurality of sample containers 21 may be arranged in one line or three or more lines, not limiting to two lines, in the radial direction of the sample turntable 2. This applies similarly to the plurality of diluent solution containers 22.

The sample turntable 2 is supported by a driving mechanism (not shown) to be rotatable in the circumferential direction. The sample turntable 2 is rotated by a driving mechanism (not shown) at a predetermined speed by a predetermined angle range in the circumferential direction.

The dilution turntable 3 is arranged around the sample turntable 2. The dilution turntable 3 is formed like a container having a substantially cylindrical shape in which one end in the axial direction opens, in the same way as the sample turntable 2. The dilution turntable 3 is supported by a driving mechanism (not shown) to be rotatable in the circumferential direction and is rotated by the driving mechanism at a predetermined speed by a predetermined angle range in the circumferential direction.

A plurality of dilution containers 23 are contained in the dilution turntable 3. The dilution containers 23 are arranged in alignment in the circumferential direction of the dilution turntable 3. Diluted samples are contained in the dilution containers 23. The diluted sample is a sample suctioned from the sample containers 21 and diluted.

A plurality of first reagent containers 24 are contained in the first reagent container containing unit 4. The plurality of first reagent containers 24 are arranged in alignment in the circumferential direction of the first reagent container containing unit 4. The first reagent containers 24 are containers for containing a first reagent.

On the other hand, a plurality of second reagent containers 25 are contained in the second reagent container containing unit 5. The plurality of second reagent containers 25 are arranged in alignment in the circumferential direction of the second reagent container containing unit 5. The second reagent containers 25 are containers for containing a second reagent.

The reaction turntable 6 is arranged around the sample turntable 2 and the dilution turntable 3. More specifically, the reaction turntable 6 is arranged in a space surrounded by the sample turntable 2 and the dilution turntable 3 and the first reagent container containing unit 4 and the second reagent container containing unit 5. The reaction turntable 6 is formed like a container having a substantially cylindrical shape in which one end in the axial direction opens, in the same way as the sample turntable 2. The reaction turntable 6 is supported by a driving mechanism (not shown) to be rotatable in the circumferential direction and is rotated by the driving mechanism at a predetermined speed by a predetermined angle range in the circumferential direction.

A plurality of reaction containers 26 are contained in the reaction turntable 6. The plurality of reaction containers 26 are arranged in alignment in the circumferential direction of the reaction turntable 6. The diluted sample sampled from the dilution containers 23, the first reagent sampled from the first reagent containers 24, and the second reagent sampled from the second reagent containers 25 are poured into the reaction containers 26. Then, the diluted sample, the first reagent, and the second reagent are agitated in the reaction containers 26 to cause a reaction.

The sample diluting unit 7 is arranged near the sample turntable 2 and the dilution turntable 3. The sample diluting unit 7 includes a dilution dispensing probe 7a and is provided as an example of dispensing mechanism. The dilution dispensing probe 7a is supported by a first driving unit (not shown) to be movable in the up-down direction, which is the axial direction of the sample turntable 2 and the dilution turntable 3. The dilution dispensing probe 7a is supported to be rotationally movable along a direction substantially parallel to the openings of the sample turntable 2 and the dilution turntable 3, that is, the horizontal direction. The dilution dispensing probe 7a is configured to reciprocate between the sample turntable 2 and the dilution turntable 3 by rotationally moving along the horizontal direction. Note that, when the dilution dispensing probe 7a moves between the sample turntable 2 and the dilution turntable 3, the dilution dispensing probe 7a passes through a cleaning device (not shown).

The operation of the dilution dispensing probe 7a of the sample diluting unit 7 will now be described. First, the dilution dispensing probe 7a of the sample diluting unit 7 moves to a predetermined position above the opening of the sample turntable 2. Next, the dilution dispensing probe 7a moves down along the axial direction of the sample turntable 2. In this manner, a tip-side (lower end-side) portion of the dilution dispensing probe 7a is inserted into a sample container 21. At this time, the dilution dispensing probe 7a suctions a predetermined quantity of sample contained in the sample container 21 by actuation of a pump (not shown). Next, the dilution dispensing probe 7a moves up along the axial direction of the sample turntable 2. In this manner, the tip-side (lower end-side) portion of the dilution dispensing probe 7a is pulled up from the inside of the sample container 21.

Next, the dilution dispensing probe 7a moves to a predetermined position above the opening of the dilution turntable 3 by rotationally moving by a predetermined quantity along the horizontal direction. Next, the dilution dispensing probe 7a moves down along the axial direction of the dilution turntable 3. In this manner, a tip-side portion of the dilution dispensing probe 7a is inserted into a predetermined dilution container 23. In this state, the dilution dispensing probe 7a discharges the sample suctioned previously and a predetermined quantity diluent solution (for example, physiological salt solution) supplied from the sample diluting unit 7 itself into the dilution container 23. As a result, the sample is diluted to a concentration of a predetermined number of times to generate a diluted sample in the dilution container 23. Thereafter, the dilution dispensing probe 7a is cleaned by the cleaning device. Note that, in the case of diluting the sample with the above-mentioned special diluent solution, a diluted sample is generated by first performing the suctioning and discharging of the special diluent solution by the dilution dispensing probe 7a in succession and then performing the suctioning and discharging of the sample by the dilution dispensing probe 7a in succession. In this case, the diluted sample may also be generated by suctioning the special diluent solution and the sample by the dilution dispensing probe 7a in succession and then discharging the diluent solution and the sample together into the dilution container 23.

The sampling unit 8 is arranged between the dilution turntable 3 and the reaction turntable 6. The sampling unit 8 includes a sampling dispensing probe 8a and is provided as an example of dispensing mechanism. The sampling dispensing probe 8a is supported by a second driving unit (not shown) to be movable in the up-down direction, which is the axial direction of the dilution turntable 3 and the reaction turntable 6. The sampling dispensing probe 8a is supported to be rotationally movable along a direction substantially parallel to the openings of the dilution turntable 3 and the reaction turntable 6, that is, the horizontal direction. The sampling dispensing probe 8a is configured to reciprocate between the dilution turntable 3 and the reaction turntable 6 by rotationally moving along the horizontal direction.

The sampling dispensing probe 8a suctions the diluted sample from a dilution container 23 set on the dilution turntable 3 and discharges the suctioned diluted sample into a reaction container 26 set on the reaction turntable 6. To suction the diluted sample from the dilution container 23, a tip-side portion of the sampling dispensing probe 8a is inserted into the dilution container 23. To discharge the diluted sample into the reaction container 26, the tip-side portion of the sampling dispensing probe 8a is inserted into the reaction container 26.

The first dispensing unit 12 is arranged between the first reagent container containing unit 4 and the reaction turntable 6. The first dispensing unit 12 includes a first dispensing probe 12a and is provided as an example of dispensing mechanism. The first dispensing probe 12a is supported by a third driving unit (not shown) to be movable in the up-down direction, which is the axial direction of the reaction turntable 6. The first dispensing probe 12a is supported to be rotationally movable along a direction substantially parallel to the opening of the reaction turntable 6, that is, the horizontal direction. The first dispensing probe 12a is configured to reciprocate between the first reagent container containing unit 4 and the reaction turntable 6 by rotationally moving along the horizontal direction.

The first dispensing probe 12a suctions the first reagent from a first reagent container 24 set on the first reagent container containing unit 4 and discharges the suctioned first reagent into a reaction container 26 set on the reaction turntable 6. To suction the first reagent from the first reagent container 24, a tip-side portion of the first dispensing probe 12a is inserted into the first reagent container 24. To discharge the first reagent into the reaction container 26, the tip-side portion of the first dispensing probe 12a is inserted into the reaction container 26.

The second dispensing unit 13 is arranged between the second reagent container containing unit 5 and the reaction turntable 6. The second dispensing unit 13 includes a second dispensing probe 13a and is provided as an example of dispensing mechanism. The second dispensing probe 13a is supported by a fourth driving unit (not shown) to be movable in the up-down direction, which is the axial direction of the reaction turntable 6. The second dispensing probe 13a is supported to be rotationally movable along a direction substantially parallel to the opening of the reaction turntable 6, that is, the horizontal direction. The second dispensing probe 13a is configured to reciprocate between the second reagent container containing unit 5 and the reaction turntable 6 by rotationally moving along the horizontal direction.

The second dispensing probe 13a suctions the second reagent from a second reagent container 25 set on the second reagent container containing unit 5 and discharges the suctioned second reagent into a reaction container 26 set on the reaction turntable 6. To suction the second reagent from the second reagent container 25, a tip-side portion of the second dispensing probe 13a is inserted into the second reagent container 25. To discharge the second reagent into the reaction container 26, the tip-side portion of the second dispensing probe 13a is inserted into the reaction container 26.

The dilution agitation device 9 is arranged around the dilution turntable 3. The dilution agitation device 9 includes a stirrer (not shown). The stirrer is inserted into the dilution container 23 and agitates the sample and the diluent solution contained in it.

The dilution cleaning device 11 is arranged around the dilution turntable 3 together with the dilution agitation device 9 described above. The dilution cleaning device 11 cleans the dilution container 23 after the diluted sample is suctioned by the sampling unit 8. The dilution cleaning device 11 includes a plurality of dilution container cleaning nozzles (not shown). The plurality of dilution container cleaning nozzles are connected to a liquid waste pump (not shown) and a detergent pump (not shown).

The step of cleaning the dilution container 23 by the dilution cleaning device 11 is performed in the following procedure.

First, the dilution cleaning device 11 inserts a dilution container cleaning nozzle into the dilution container 23 and drives the liquid waste pump to draw in the diluted sample remaining in the dilution container 23 by the dilution container cleaning nozzle. The dilution cleaning device 11 discharges the diluted sample drawn in by the dilution container cleaning nozzle into a waste liquid tank (not shown).

Next, the dilution cleaning device 11 drives the detergent pump to supply detergent to the dilution container cleaning nozzle and discharge the supplied detergent from the dilution container cleaning nozzle into the dilution container 23. As a result of the discharging of the detergent, the interior of the dilution container 23 is cleaned. Thereafter, the dilution cleaning device 11 suctions the detergent remaining in the dilution container 23 by the dilution container cleaning nozzle and then dries the interior of the dilution container 23. The cleaning of the dilution container 23 is completed in the above-described manner.

The first reaction agitation device 14, the second reaction agitation device 15, and the reaction container cleaning device 18 are arranged around the reaction turntable 6. The first reaction agitation device 14 includes a stirrer (not shown) and agitates the diluted sample and the first reagent by inserting the stirrer into the reaction container 26. In this manner, the reaction between the diluted sample and the first reagent occurs uniformly and quickly. Note that the configuration of the first reaction agitation device 14 is the same as the configuration of the dilution agitation device 9. Thus, description of the configuration of the first reaction agitation device 14 will be omitted.

The second reaction agitation device 15 includes a stirrer (not shown) and agitates the diluted sample, the first reagent, and the second reagent by inserting the stirrer into the reaction container 26. In this manner, the reaction between the diluted sample, the first reagent, and the second reagent occurs uniformly and quickly. Note that the configuration of the second reaction agitation device 15 is the same as the configuration of the dilution agitation device 9. Thus, description of the configuration of the second reaction agitation device 15 will be omitted.

The multi-wavelength photometer 16 is arranged around the reaction turntable 6 to face the external wall of the reaction turntable 6. The multi-wavelength photometer 16 performs optical measurement on the diluted sample poured into the reaction container 26 and reacting with the first reagent and the second reagent. The multi-wavelength photometer 16 is a photometer for detecting the reacting state of the diluted sample and outputs numerical data of "absorbance" obtained by detection (measurement) on the diluted sample. Since the numerical data of absorbance output by the multi-wavelength photometer 16 varies depending on the quantities of various components in the sample, the quantity of each component can be determined from the numerical data.

The constant-temperature chamber 17 maintains the temperature of the first reagent containers 24 set on the first reagent container containing unit 4, the temperature of the second reagent containers 25 set on the second reagent container containing unit 5, and the temperature of the reaction containers 26 set on the reaction turntable 6 at a constant temperature. In this manner, liquid contained in each container (24, 25, 26) is maintained at the constant temperature.

The reaction container cleaning device 18 is a device for cleaning the interior of a reaction container 26 for which inspection is finished. The reaction container cleaning device 18 includes a plurality of reaction container cleaning nozzles (not shown). The plurality of reaction container cleaning nozzles are connected to a liquid waste pump (not shown) and a detergent pump (not shown) in the same way as the above-mentioned dilution container cleaning nozzles. Note that the step of cleaning the reaction container 26 by the reaction container cleaning device 18 is similar to the step of cleaning the dilution container 23 by the dilution cleaning device 11 described above except that the object to be cleaned is different. Thus, description of the step of cleaning the reaction container 26 by the reaction container cleaning device 18 will be omitted.

Figure 2:
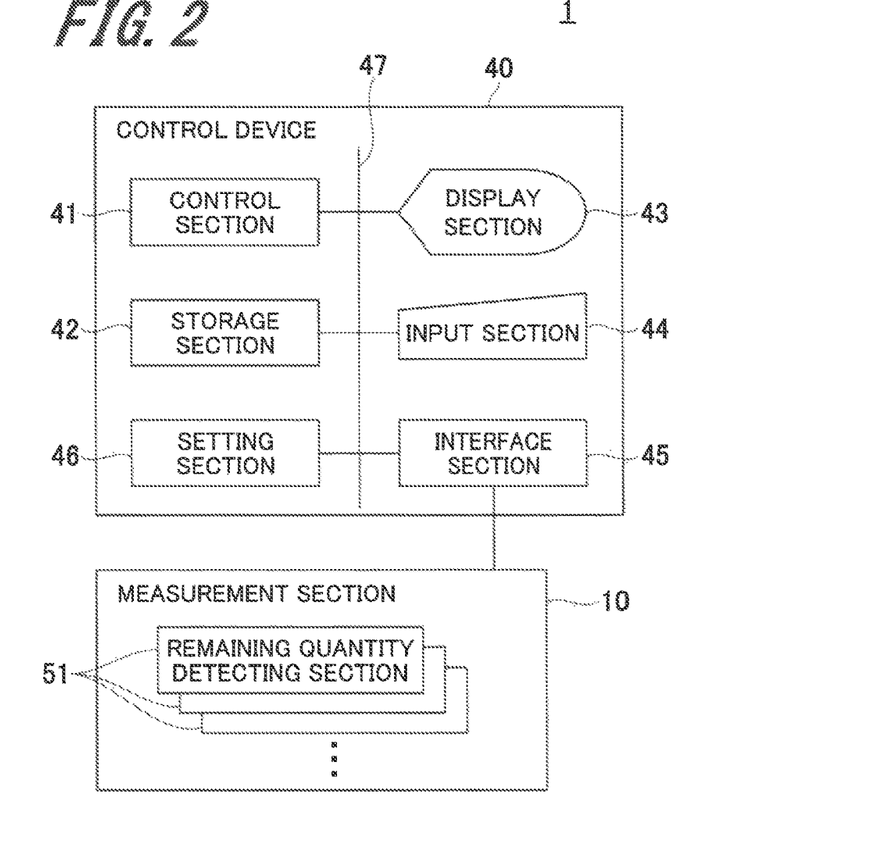
FIG. 2 is a block diagram showing an example of a control system configuration of the automatic analysis apparatus according to the embodiment of the present invention.

FIG. 2 is a block diagram showing an example of configuration of a control system of the automatic analysis apparatus according to the embodiment of the present invention.

As shown in FIG. 2, the control device 40 is a computer including a control section 41, a storage section 42, a display section 43, an input section 44, an interface section 45, a setting section 46, and a bus 47 connecting those sections (41 to 46). The measurement section 10 is electrically connected to the control device 40 via the interface section 45. A plurality of remaining quantity detecting sections 51 are provided in the measurement section 10.

Each remaining quantity detecting sections 51 is a section that detects that the remaining quantity of a consumable article used in the measurement section 10 has become less than or equal to a predetermined quantity that is set in advance. When detecting that the remaining quantity of the consumable article to be detected has become less than or equal to the predetermined quantity, the remaining quantity detecting section 51 outputs a detection signal indicating that. In response, the control device 40 receives the detection signal output from the remaining quantity detecting section 51 at the interface section 45 and causes the control section 41 to capture the received detection signal.

If the consumable article to perform the remaining quantity detection is a liquid, the remaining quantity detecting section 51 is composed of a sensor that detects the liquid surface height (liquid level) in a container containing the liquid, for example. The liquid used as the consumable article in the measurement section 10 includes at least one of a reagent that reacts with the sample, a diluent solution for diluting the sample, and a cleaning solution for cleaning a predetermined portion of the measurement section 10. For example, the portion of the measurement section 10 to be cleaned is a container for containing a liquid such as a sample, a diluent solution, or a reagent, a dispensing probe used for dispensing a liquid, a stirrer used for agitating a liquid, and the like.

However, the consumable article is not limited to a liquid. For example, the consumable article other than a liquid is a disposable reaction cell (cuvette), a disposable chip used by being attached to the tip of a probe, an ion-selective electrode used for analysis of electrolytes, and the like. That is, the consumable article in the present invention includes any consumable article used in the measurement section 10 regardless of the state of matter such as liquid, gas, solid, or gel.

In this regard, a remaining quantity detecting section 51 is provided for each consumable article. For example, with regard to a liquid such as the reagent, the diluent solution, or the cleaning solution used in the measurement section 10, a remaining quantity detecting section 51 is provided for each purpose of the liquid. The reagent is a liquid used for the purpose of causing a chemical reaction, the diluent solution is a liquid used for the purpose of dilution, and the cleaning solution is a liquid used for the purpose of cleaning. Therefore, a remaining quantity detecting section 51 for detecting the remaining quantity of the reagent, a remaining quantity detecting section 51 for detecting the remaining quantity of the diluent solution, and a remaining quantity detecting section 51 for detecting the remaining quantity of the cleaning solution are provided separately. In the case of using reagents, diluent solutions, or cleaning solutions different types (compositions) in the measurement section 10, a remaining quantity detecting section 51 is provided for each type of reagent, diluent solution, or cleaning solution. For example, since a reagent of a different type (composition) is used for each measurement item in the measurement section 10 even though the reagent is used for the purpose of causing a chemical reaction, a remaining quantity detecting section 51 is provided for each type of reagent.

A predetermined quantity applied for the remaining quantity detection of the remaining quantity detecting section 51 is set for each remaining quantity detecting section 51. In that case, if the consumable article is a liquid, the predetermined quantity is defined by a quantity of liquid. If the consumable article is other than a liquid, the predetermined quantity is defined by a quantity (such as mass or number) of the consumable article, the remaining count or period of available use (such as the number of days or time of available use) of the consumable article.

The control section 41 includes, for example, a central processing unit (CPU), a read only memory (ROM) for storing a program to be executed by the CPU and the like, and a random access memory (RAM) used as a workspace of the CPU. The control section 41 controls overall processes and operations of the automatic analysis apparatus 1 including the measurement section 10 as a result of the CPU executing the program read from the ROM onto the RAM.

The storage section 42 is composed of a non-volatile semiconductor memory (referred to as a flash memory), a hard disk drive (HDD), a solid state drive (SSD), and the like. The storage section 42 stores various pieces of electronic information such as data and parameters to be referenced by the control section 41 in controlling the processes and operations of the automatic analysis apparatus 1. The data stored in the storage section 42 includes data used for various processes performed in the measurement section 10, for example, measurement processes for biochemical analysis, maintenance processes, and the like. When the measurement section 10 has the electrolyte analysis function, the data stored in the storage section 42 includes data used for measurement processes for electrolyte analysis. On the other hand, the maintenance processes include processes for preparation operations and ending operations for measurement. The maintenance processes include, for example, a process of cleaning an ion-selective electrode, a process of filling a dilution bath with water, and the like performed in an automatic analysis apparatus having an electrolyte analysis function.

The display section 43 is composed of a liquid crystal display (LCD), an electro luminescence (EL) display, or the like. The display section 43 displays measurement data obtained by measurement by the measurement section 10, an analysis result based on the measurement data, and the like. The display section 43 also displays various screens such as various setting screens and operation screens, status screens indicating states of the measurement section 10, and alarm screens containing errors or alerts.

The input section 44 is a section at which the operator inputs various pieces of data to the automatic analysis apparatus 1. For example, the input section 44 is composed of a mouse, a keyboard, a touch panel, and the like. Data input by the input section 44 is captured in the control section 41 and stored in the storage section 42 as needed.

The interface section 45 receives various pieces of data output from the measurement section 10 and provides the received data to the control section 41. The data output from the measurement section 10 includes measurement data obtained by measurement in the measurement section 10, detection signals output from the remaining quantity detecting sections 51, and the like. The interface section 45 also receives various pieces of data output from the control section 41 and provides the received data to the measurement section 10. Thus, the interface section 45 transfers data between the control section 41 and the measurement section 10, so that the control section 41 can control the operations of the sections of the measurement section 10.

The setting section 46 is a functional section realized by a CPU, a ROM, a RAM, and the like, which are computer hardware resources. The setting section 46 is a section that is capable of setting in which mode, of a first mode and a second mode applied for operation control of the measurement section 10, to operate the measurement section 10 for each consumable article when the remaining quantity detecting section 51 detects that the remaining quantity of the consumable article has become less than or equal to the predetermined quantity. That is, the setting section 46 can set the mode for each consumable article. The consumable articles are classified according to its purpose or type. The control section 41 controls the operation of the measurement section 10 based on the setting of the setting section 46. The following gives specific description.

The first mode and the second mode are applied as modes in which the control section 41 controls the operation of the measurement section 10 when the remaining quantity detecting section 51 detects that the remaining quantity of a consumable article has become less than or equal to a predetermined quantity (hereinafter referred to as "control modes"). For example, when the remaining quantity detecting section 51 detects that the remaining quantity of a consumable article Y has become less than or equal to a predetermined quantity, the control section 41 controls the operation of the measurement section 10 according to the first mode if the control mode set in association with the consumable article Y is the first mode, and the control section 41 controls the operation of the measurement section 10 according to the second mode if the control mode set in association with the consumable article Y is the second mode.

The difference between the first mode and the second mode will now be described.

The first mode is a mode that disables processing for a processing item for which a consumable article whose remaining quantity has become less than or equal to a predetermined quantity is used. For example, if the processing item is a measurement item related to measurement of the sample, a mode that disables measurement for this measurement item corresponds to the first mode. If the processing item is a maintenance item related to maintenance of the measurement section 10, a mode that disables maintenance for this maintenance item corresponds to the first mode. In the present invention, processing items may include both of a measurement item and a maintenance item, or may include only one of them.

The number of measurement items related to measurement of the sample is not limited to one and may be two or more. Thus, even when measurement for one measurement item is disabled according to the first mode, the measurement section 10 continues measurement for other measurement items. This will be described below with reference to a specific example.

A plurality of first reagent containers 24 are contained in the first reagent container containing unit 4. Each first reagent container 24 contains a first reagent having a different type (composition) for each measurement item of the sample. Here, for convenience of description, it is assumed that three measurement items A, B, and C are specified for performing analysis of the sample, a first reagent a is used for measurement for a measurement item A, a first reagent b is used for measurement for a measurement item B, and a first reagent c is used for measurement for a measurement item C. It is also assumed that the first mode is set in association with the first reagent a by mode setting using the setting section 46, and the control section 41 controls the operation of the measurement section 10 according to the first mode upon the remaining quantity of the first reagent a becoming less than or equal to the predetermined quantity.

In that case, the control section 41 controls the operation of the measurement section 10 such that the first dispensing unit 12 does not perform the suctioning of the first reagent a for a first reagent container 24 containing the first reagent a, that is, skips the operation of suctioning the first reagent a. Thus, measurement for the measurement item A is disabled, but measurement for the measurement item B and the measurement item C is continued. Therefore, lowering of the measurement efficiency of the measurement section 10 is suppressed.

The second mode is a mode that temporarily stops operation of equipment of the measurement section 10 handling a consumable article whose remaining quantity has become less than or equal to a predetermined quantity until the consumable article is replenished. The word "temporarily" mentioned herein means until the consumable article whose remaining quantity has become less than or equal to the predetermined quantity is replenished, so that operation of equipment stopped until then can be restarted. The replenishment of the consumable article is performed by the operator. The replenishment of the consumable article includes changing of the consumable article. For example, the replenishment of the first reagent is performed by changing from a first reagent container 24 that is emptied after use to a new (unused) first reagent container 24 or by refilling an emptied first reagent container 24 with the first reagent. The replenishment of the special diluent solution is performed by changing from a diluent solution container 22 that is emptied after use to a new (unused) diluent solution container 22 or by refilling an emptied diluent solution container 22 with the diluent solution.

The equipment of the measurement section 10 whose operation is temporarily stopped according to the second mode includes at least one of the sample diluting unit 7, the sampling unit 8, the dilution cleaning device 11, the first dispensing unit 12, the second dispensing unit 13, and the reaction container cleaning device 18, and further other dispensing mechanisms and cleaning devices. As described above, the second mode is a mode that temporarily stops the equipment of the measurement section 10. Thus, if the control section 41 controls the operation of the measurement section 10 according to the second mode upon the remaining quantity of a consumable article becoming less than or equal to a predetermined quantity during a measurement process (analysis operation) on the sample, the equipment is temporarily stopped and thus the operation of the measurement section 10 is stopped, which may lower the measurement efficiency. However, depending on the purpose or type of the consumable article, it may be better to perform replenishment of the consumable article early. Thus, the second mode temporarily stops the operation of equipment of the measurement section 10 handling a consumable article requiring replenishment and transitions the operation of the measurement section 10 to a state where the consumable article can be replenished. The state where the consumable article can be replenished refers to a state where the operator can safely perform the operation of replenishing the consumable article.

Figure 3:
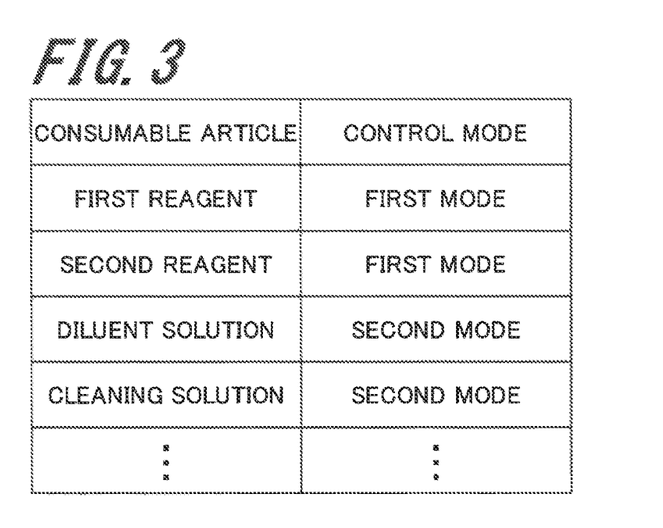
FIG. 3 is a conceptual diagram showing an example of control mode setting by a setting section.

FIG. 3 is a conceptual diagram showing an example of control mode setting by the setting section 46. Note that, for ease of understanding of description, FIG. 3 shows an example where the control modes are set by separating liquids as consumable articles into the first reagent, the second reagent, the diluent solution, and the cleaning solution.

The setting example shown in FIG. 3 is an example where the control mode applied to the first reagent is set to the first mode, the control mode applied to the second reagent is set to the first mode, the control mode applied to the diluent solution is set to the second mode, and the control mode applied to the cleaning solution is set to the second mode. As described above, the measurement section 10 may use a plurality of types of first reagent with a different composition for each measurement item. That is, a plurality of first reagents having different types or purposes are used in the measurement section 10. Thus, the setting section 46 can set a control mode for each type or purpose of first reagent. This applies similarly to the second reagent. If there are a plurality of purposes or types of diluent solution used in the measurement section 10, the setting section 46 can set a control mode for each purpose or type of diluent solution. Similarly, if there are a plurality of purposes or types of cleaning solution used in the measurement section 10, the setting section 46 can set a control mode for each purpose or type of cleaning solution. In regard to consumable articles other than liquid, a control mode can be set for each purpose or type of consumable article.

The setting of the control mode by the setting section 46 is performed according to an input operation of the operator using the input section 44. Specifically, this is performed in the following procedure, for example.

First, a predetermined screen is displayed on the display section 43, and when a control mode setting button contained in the screen is pushed by the operator using the input section 44, the setting section 46 causes the display section 43 to display a control mode setting screen. In the control mode setting screen, a plurality of consumable articles are displayed in the form of a list according to the purposes or type and a default mode or a mode set by a previous input operation is displayed in a control mode setting box corresponding to each consumable article. Instead of the setting section 46, the control section 41 may cause the display section 43 to display the control mode setting screen.

Next, the operator selects a consumable article for which to set or change its control mode by performing a mouse-clicking operation, for example. Then, the first mode and the second mode are displayed as options in the control mode setting box corresponding to the consumable article selected by the operator. At this time, a text describing the details of each of the first mode and the second mode may be displayed.

Next, the operator selects a desired mode from the first mode and the second mode displayed in the control mode setting box as described above by performing a mouse-clicking operation, for example. Then, the control mode (the first mode or the second mode) selected by the operator is displayed in the control mode setting box corresponding to the consumable article selected by the operator. Thereafter, a procedure similar to the above is repeated when there is a consumable article for which to set or change the control mode.

When finishing the operation of setting or changing the control mode for all the consumable articles for which to set or change the control mode, the operator pushes a confirmation button contained in the control mode setting screen by a mouse-clicking operation or an operation of pushing a return key on a keyboard. Then, the setting section 46 causes the storage section 42 to store setting information displayed in the control mode setting screen when the confirmation button is pushed. The setting of the control mode by the setting section 46 is completed in the above-described manner. Note that the control mode setting procedure illustrated here is merely an example and another procedure may be performed.

Figure 4:
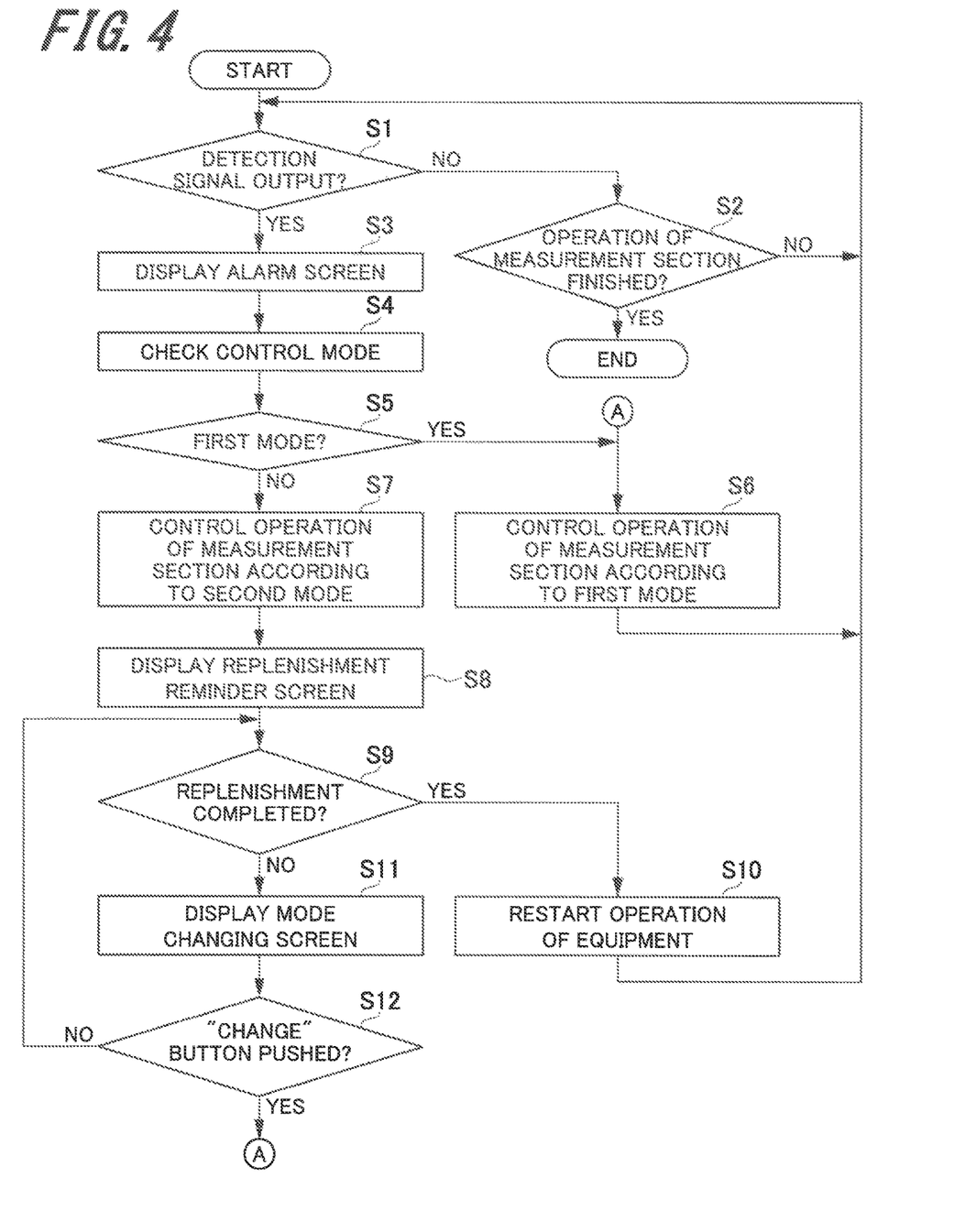
FIG. 4 is a flow chart showing an example of processes performed in an automatic analysis apparatus according to the embodiment of the present invention.

FIG. 4 is a flow chart showing an example of processes performed in an automatic analysis apparatus 1 according to the embodiment of the present invention.

First, when an operation of the measurement section 10 of the automatic analysis apparatus 1 is started, the control section 41 monitors whether or not a detection signal is output from any remaining quantity detecting section 51 of the plurality of remaining quantity detecting sections 51 (step S1). Operations of the measurement section 10 include operations for the foregoing measurement processes and operations for the maintenance processes. The operations for the measurement processes include measurement operations for analysis of the sample and measurement operations using a calibration sample. The operations for the maintenance processes include the foregoing preparation operations and ending operations.

Regarding one remaining quantity detecting section 51, a case where the remaining quantity detecting section 51 outputs a detection signal corresponds to a case where the remaining quantity detecting section 51 detects that the remaining quantity of a consumable article on which the remaining quantity detecting section 51 performs remaining quantity detection has become less than or equal to a predetermined quantity. More specifically, a case where a remaining quantity detecting section 51 performing detection of the remaining quantity of the first reagent outputs a detection signal corresponds to a case where the remaining quantity detecting section 51 detects that the remaining quantity of the first reagent has become less than or equal to a predetermined quantity.

When a detection signal is not output from any remaining quantity detecting section 51 in step S1, the process transitions to step S2. When a detection signal is output from any remaining quantity detecting section 51, the process proceeds to step S3. In step S2, the control section 41 determines whether or not the operation of the measurement section 10 is finished. When it is determined that the operation of the measurement section 10 is not finished, the process returns to step S1. When it is determined that the operation of the measurement section 10 is finished, the process immediately ends.

On the other hand, in step S3, the control section 41 causes the display section 43 to display an alarm screen. The alarm screen is a screen for notifying the operator that the remaining quantity of a consumable article has become less than or equal to a predetermined quantity. Thus, the alarm screen may be any screen as long as the operator when looking at the alarm screen can recognize that the remaining quantity of any consumable article has become less than or equal to a predetermined quantity. The alarm screen is preferably displayed in a pop-up manner. Possible examples of the pop-up display include balloon display, dialogue display, and the like. By displaying the alarm screen in a pop-up manner on the display section 43, it is easier for the operator to notice that the remaining quantity of the consumable article has become less than or equal to the predetermined quantity than in the case of simply displaying a text (without pop-up display).

Next, the control section 41 checks which mode, of the first mode and the second mode, the control mode set in association with the consumable article whose remaining quantity has become less than or equal to the predetermined quantity is (step S4). This check is performed based on control mode setting information stored in the storage section 42. For example, when sensing that a detection signal is output from the remaining quantity detecting section 51 performing detection of the remaining quantity of the first reagent in step S1, the control section 41 checks that the control mode set in association with the first reagent is the first mode based on control mode setting information stored in the storage section 42, as shown in FIG. 3. Note that the checking of the control mode by the control section 41 may be performed by the control section 41 accessing the storage section 42 every time, or may be performed based on setting information read from the storage section 42 onto the RAM in advance.

Next, the control section 41 determines whether or not the control mode checked in step S4 is the first mode (step S5). The control section 41 proceeds to step S6 if the checked control mode is the first mode, and proceeds to step S7 if the checked control mode is not the first mode, that is, it is the second mode.

In step S6, the control section 41 controls the operation of the measurement section 10 according to the first mode. In the first mode, the control section 41 disables processing for a processing item for which a consumable article whose remaining quantity has become less than or equal to a predetermined quantity is used. For example, if the consumable article whose remaining quantity has become less than or equal to the predetermined quantity is the first reagent, the control section 41 disables measurement for a measurement item for which the first reagent is used and allows the measurement section 10 to continue measurement for other measurement items. If the consumable article whose remaining quantity has become less than or equal to the predetermined quantity is the diluent solution, the control section 41 disables measurement for a measurement item for which the diluent solution is used and allows the measurement section 10 to continue measurement for other measurement items. If the consumable article whose remaining quantity has become less than or equal to the predetermined quantity is a consumable article used for a maintenance process, the control section 41 disables maintenance for a maintenance item for which the consumable article is used. After step S6, the process returns to step S1.

On the other hand, in step S7, the control section 41 controls the operation of the measurement section 10 according to the second mode. In the second mode, the control section 41 temporarily stops operation of equipment of the measurement section 10 handling a consumable article whose remaining quantity has become less than or equal to a predetermined quantity until the consumable article is replenished. For example, if the consumable article whose remaining quantity has become less than or equal to the predetermined quantity is the diluent solution handled in the sample diluting unit 7, the operation of the sample diluting unit 7 is temporarily stopped. If the consumable article whose remaining quantity has become less than or equal to the predetermined quantity is the second reagent, the operation of the second dispensing unit 13 handling the second reagent is temporarily stopped. This applies similarly to dispensing mechanisms other than the second dispensing unit 13 (the sample diluting unit 7, the sampling unit 8, and the first dispensing unit 12). The control section 41 also transitions the operation of the measurement section 10 to a state where the consumable article can be replenished. As a result, the measurement section 10 is put in a state of awaiting replenishment of the consumable article.

Next, the control section 41 causes the display section 43 to display a screen suggesting replenishment of the consumable article (hereinafter referred to as a replenishment reminder screen) (step S8). If the consumable article whose remaining quantity has become less than or equal to the predetermined quantity is the second reagent, a possible example of the replenishment reminder screen is a message screen suggesting replenishment of the second reagent. The replenishment reminder screen is desirably displayed in a pop-up manner in the same way as the alarm screen described above.

Thereafter, the control section 41 monitors whether or not the replenishment of the consumable article is completed (step S9). The replenishment of the consumable article is performed by the operator. When finishing the operation of replenishing the consumable article, the operator notifies the control section 41 that the replenishment of the consumable article is completed by performing a predetermined input operation, for example, an operation of clicking a "replenishment complete" button contained in the replenishment reminder screen with a mouse. The control section 41 determines NO in step S9 and transitions to the process of step S11 until the "replenishment complete" button is pushed, and determines YES in step S9 and proceeds to the process of step S10 when the "replenishment complete" button is pushed.

In step S10, the control section 41 restarts the operation of the equipment of the measurement section 10 stopped until then. For example, when the operation of the sample diluting unit 7 is stopped in step S7 above, the operation of the sample diluting unit 7 is restarted in step S10. In this manner, the measurement section 10 can perform processes for all the specified processing items (such as measurement items and maintenance items). After step S10, the process returns to step S1.

In step S11, the control section 41 accepts an instruct to change the control mode applied for operation control of the measurement section 10 from the second mode to the first mode. Specifically, the control section 41 causes the display section 43 to display a mode-changing screen for accepting a change of the control mode. A "change" button for instructing to change from the second mode to the first mode is displayed in the mode-changing screen. When the "change" button is pushed by an input operation of the operator, for example, a mouse-clicking operation, the control section 41 determines YES in step S12 and transitions to the process of step S6, and returns to step S9 when the "change" button is not pushed. The mode-changing screen is displayed on the display section 43 until it is determined YES in step S9 or it is determined YES in step S12.

When the transition from step S12 to step S6 occurs, at least the process of step S7 out of step S7 and step S8 is cancelled. Thus, in the case where the operation of the second dispensing unit 13 handling the second reagent is temporarily stopped in step S7, for example, the stopping of the operation of the second dispensing unit 13 is released. In addition, when the transition to step S6 occurs, measurement for a measurement item for which a second reagent whose remaining quantity has become less than or equal to the predetermined quantity is used is disabled, and measurement using a second reagent of a different type (composition) than that second reagent is restarted when the operation of the second dispensing unit 13 is restarted. Therefore, even when the operator once stops operation of predetermined equipment of the measurement section 10 according to the second mode and the measurement operation of the measurement section 10 is stopped, measurement of the sample except for some measurement items can be restarted.

As described above, the embodiment of the present invention adopts a configuration in which the setting section 46 sets in which mode, of the first mode and the second mode, to operate the measurement section 10 for each consumable article when the remaining quantity detecting section 51 detects that the remaining quantity of a consumable article has become less than or equal to a predetermined quantity, and the control section 41 controls operation of the measurement section 10 based on the setting of the setting section 46. In this manner, it is possible to set the control mode in a more detailed manner than in the case of setting the control mode for each measurement item, for example. Therefore, it is possible to increase the frequency of adopting the first mode, which is advantageous in processing efficiency, and decrease the frequency of adopting the second mode accordingly as compared to the case of setting the control mode for each measurement item. This allows the measurement section 10 to operate more efficiently.

In addition, as compared to the technique disclosed in JP 2004-28931 A described above, the following effects can be expected besides the above-described effects. In the technique disclosed in JP 2004-28931 A, when the second method, which involves temporarily stopping the analysis module, is adopted, the entire analysis module, which corresponds to the measurement section 10, is temporarily stopped. Accordingly, the processing efficiency of the analysis module temporarily stopped is significantly lowered. In contrast, in the embodiment of the present invention, when controlling the operation of the measurement section 10 according to the second mode, the control section 41 temporarily stops the operation of equipment of the measurement section 10 handling a consumable article whose remaining quantity has become less than or equal to a predetermined quantity. In that case, depending on the function (role) of the equipment whose operation is temporarily stopped, it is also possible to temporarily stop the operation of equipment used in a step upstream from that equipment in a measurement process or maintenance process, but not the entire operation of the measurement section 10 is temporarily stopped. Thus, in the case of controlling the operation of the measurement section 10 in the second mode, it is more possible to suppress the lowering of the processing efficiency than in the technique disclosed in JP 2004-28931 A.

The technical scope of the present invention is not limited to the above-described embodiment and encompasses various modifications and improvements as long as the particular effects obtained from the configurational requirements of the invention or combinations of the configurational requirements can be derived. This will be described below with reference to specific examples.

First, when the remaining quantity of a liquid used for a measurement process of the measurement section 10 becomes less than or equal to a predetermined quantity, measurement of samples can often be performed several times using a quantity of the liquid less than or equal to the predetermined quantity. Thus, a configuration may be adopted in which the control section 41 causes the display section 43 to display, when any remaining quantity detecting section 51 detects that the remaining quantity of a consumable article has become less than or equal to a predetermined quantity, the number of samples measurable using the remaining consumable article at the point of time of the detection. In the case of adopting this configuration, the control section 41 may also perform so-called count-down display by decrementing the number of samples displayed by the display section 43 each time measurement of a sample is performed using the remaining consumable article. In this manner, the operator can recognize the number of samples measurable using the consumable article remaining at the time of the detection in real time. In addition, in controlling the operation of the measurement section 10 according to the first mode, the control section 41 may perform the control by, at the timing of finishing measurement of a number of samples measurable using the consumable article remaining at the time of the detection, disabling processing for a processing item for which the consumable article is used. In this manner, the consumable article can be used without waste. Note that, although the number of samples measurable using the remaining consumable article is determined by the maker of the automatic analysis apparatus 1, a configuration in which it can be arbitrarily set by a user of the automatic analysis apparatus 1 may also be adopted as long as it is smaller than the number determined by the maker.

When the remaining quantity detecting section 51 detects that the remaining quantity of a consumable article has become less than or equal to a predetermined quantity during measurement of a calibration sample in the measurement section 10, or during preparation of the measurement, or during an ending operation of the measurement section 10, the control section 41 may control the operation of the measurement section 10 according to the first mode regardless of the setting of the setting section 46. This is because the necessity to stop the operation of equipment of the measurement section 10 is low during measurement of the calibration sample, or during preparation of the measurement, or during an ending operation of the measurement section 10, and controlling the operation of the measurement section 10 according to the first mode provides higher processing efficiency. In the flow chart shown in FIG. 4, a step of determining whether the measurement of the calibration sample is being performed, or the preparation of the measurement is being performed, or the ending operation of the measurement section 10 is being performed may be provided before the control section 41 performs the process of step S7 after determining YES in step S1, and a procedure of performing the process of step S6 when it is determined YES in this step S may be adopted.

The control section 41 may also issue an alert indicating that measurement on a new sample is not to be performed when an instruct to add the new sample is received after the remaining quantity detecting section 51 detects that the remaining quantity of a consumable article has become less than or equal to a predetermined quantity. For example, the instruction to add the new sample is performed by pushing an "add sample" button displayed in a screen of the display section 43 by a mouse operation, setting the sample container at a predetermined position, or the like. The alert may be any of an alert by means of screen display on the display section 43, an alert by means of sound, an alert by means of light (such as glowing or flashing of a lamp), or an alert using a combination thereof.

What is claimed is:

1. An automatic analysis apparatus comprising:
    a measurement section comprising a multi-wavelength photometer configured to measure a sample;
    a plurality of remaining quantity detecting sections, each comprising a sensor configured to detect whether a remaining quantity of a consumable article of a plurality of consumable articles used in the measurement section is less than or equal to a predetermined quantity that is set in advance, wherein the plurality of consumable articles includes: a reagent that is used for a purpose of causing a chemical reaction with the sample, a diluent solution that is used for a purpose of diluting the sample, and a cleaning solution that is used for a purpose of cleaning a predetermined portion of the measurement section;
    a setting section comprising at least one processor configured to set a mode of operation of the measurement section comprising one of a first mode of operation and a second mode of operation, for a respective purpose of the consumable article of the plurality of consumable articles, wherein the mode of operation of the measurement section controls the measurement section for each consumable article of the plurality of consumable articles in response to a respective remaining quantity detecting section detecting that a respective remaining quantity of the consumable article of the plurality of consumable articles is less than or equal to the predetermined quantity; and
    a control section comprising at least one processor configured to control operation of the measurement section based on setting the mode of operation of the measurement section.

2. The automatic analysis apparatus according to claim 1, wherein
    setting the mode of operation of the measurement section to the first mode of operation comprises disabling processing for a processing item for which the consumable article, of which the remaining quantity is less than or equal to the predetermined quantity, is used, and
    setting the mode of operation of the measurement section to the second mode of operation comprises temporarily stopping operation of equipment of the measurement section handling the consumable article, of which the remaining quantity is less than or equal to the predetermined quantity, until the consumable article is replenished.

3. The automatic analysis apparatus according to claim 2, wherein the measurement section includes a dispensing mechanism that dispenses a liquid as the consumable article into a container, and wherein, the control section temporarily stops operation of the dispensing mechanism in the second mode of operation in response to the remaining quantity detecting section detecting that the remaining quantity of the liquid is less than or equal to the predetermined quantity.

4. The automatic analysis apparatus according to claim 2, wherein
the processing item is at least one of a measurement item and a maintenance item.

5. The automatic analysis apparatus according to claim 1, comprising:
a display section, wherein the control section causes the display section to display an alarm screen in response to the remaining quantity detecting section detecting that the remaining quantity of the consumable article is less than or equal to the predetermined quantity.

6. The automatic analysis apparatus according to claim 2, comprising:
a display section, wherein the control section causes the display section to display a screen suggesting replenishment of the consumable article in the second mode of operation in response to the remaining quantity detecting section detecting that the remaining quantity of the consumable article is less than or equal to the predetermined quantity.

7. The automatic analysis apparatus according to claim 1, comprising:
a display section, wherein the control section causes the display section to display a number of samples measurable using the consumable article remaining at a point of time of the detection in response to the remaining quantity detecting section detecting that the remaining quantity of the consumable article is less than or equal to the predetermined quantity.

8. The automatic analysis apparatus according to claim 7, wherein the control section decrements the number of samples displayed by the display section each time measurement of the sample is performed using the remaining consumable article.

9. The automatic analysis apparatus according to claim 2, wherein the control section controls the operation of the measurement section according to the first mode of operation regardless of the setting of the setting section in response to the remaining quantity detecting section detecting that the remaining quantity of the consumable article is less than or equal to the predetermined quantity: during measurement of a calibration sample in the measurement section, or during preparation of the measurement, or during an ending operation of the measurement section.

10. The automatic analysis apparatus according to claim 1, wherein after the remaining quantity detecting section detects that the remaining quantity of the consumable article is less than or equal to the predetermined quantity, an instruction to add a new sample is received and the control section issues an alert indicating that measurement of the new sample is not to be performed.

11. The automatic analysis apparatus according to claim 2, wherein, when controlling operation of the measurement section according to the second mode of operation, the control section monitors whether replenishment of the consumable article whose the remaining quantity less than or equal to the predetermined quantity is completed, and accepts an instruction to change a mode applied for operation control of the measurement section from the second mode of operation to the first mode of operation during the monitoring.

* * * * *